(12) United States Patent  
Chavez et al.

(10) Patent No.: US 11,806,880 B2  
(45) Date of Patent: Nov. 7, 2023

(54) ROBOTIC HANDLING OF SOFT PRODUCTS IN NON-RIGID PACKAGING

(71) Applicant: Dexterity, Inc., Palo Alto, CA (US)

(72) Inventors: Kevin Jose Chavez, Woodside, CA (US); Robert Hegdahl, Hayward, CA (US); Yuan Gao, Mountain View, CA (US); Andrew Lovett, Redwood City, CA (US); Roger Lam Hau, Millbrae, CA (US); Samir Menon, Palo Alto, CA (US)

(73) Assignee: Dexterity, Inc., Redwood City, CA (US)

( * ) Notice: Subject to any disclaimer, the term of this patent is extended or adjusted under 35 U.S.C. 154(b) by 183 days.

(21) Appl. No.: 16/797,359

(22) Filed: Feb. 21, 2020

(65) Prior Publication Data

US 2020/0269429 A1 Aug. 27, 2020

Related U.S. Application Data

(60) Provisional application No. 62/809,398, filed on Feb. 22, 2019.

(51) Int. Cl.
*B25J 9/16* (2006.01)
*B25J 15/06* (2006.01)
*B25J 11/00* (2006.01)

(52) U.S. Cl.
CPC .......... *B25J 9/1687* (2013.01); *B25J 9/1612* (2013.01); *B25J 9/1689* (2013.01); *B25J 9/1694* (2013.01);

(Continued)

(58) Field of Classification Search
CPC ...... B25J 9/1687; B25J 9/1612; B25J 9/1689; B25J 9/1694; B25J 9/1697; B25J 11/0045;

(Continued)

(56) References Cited

U.S. PATENT DOCUMENTS 10,124,489 B2 * 11/2018 Chitta .................... B65G 61/00
2003/0110610 A1 * 6/2003 Duquette ............. H04N 13/239
348/E13.005

(Continued)

FOREIGN PATENT DOCUMENTS

JP H0592388 4/1993
JP 2013154457 8/2013

(Continued)

*Primary Examiner* — Adam R Mott
*Assistant Examiner* — Elizabeth Rose Neleski
(74) *Attorney, Agent, or Firm* — Van Pelt, Yi & James LLP

(57) ABSTRACT

Techniques are disclosed to perform robotic handling of soft products in non-rigid packaging. In various embodiments, sensor data associated with a workspace is received. An action to be performed in the workspace using one or more robotic elements is determined, the action including moving an end effector of one of the robotic elements relatively quickly to a location in proximity to an item to be grasped; actuating a grasping mechanism of the end effector to grasp the item using an amount of force and structures associated with minimized risk of damage to one or both of the item and its packaging; and using sensor data generated subsequent to the item being grasped to ensure the item has been grasped securely. Control communications are sent to the robotic element via the communication interface to cause robotic element to perform the action.

20 Claims, 12 Drawing Sheets

(52) U.S. Cl.
CPC ......... *B25J 9/1697* (2013.01); *B25J 11/0045* (2013.01); *B25J 15/0616* (2013.01); *B25J 15/0683* (2013.01)

(58) Field of Classification Search
CPC .. B25J 15/0616; B25J 15/0683; B25J 19/023; B25J 15/0052; G05B 2219/39469; G05B 2219/39558
See application file for complete search history.

(56) References Cited

U.S. PATENT DOCUMENTS

| | | | |
|---|---|---|---|
| 2011/0254298 A1* | 10/2011 | Lomerson, Jr. ...... | B25J 15/0616 294/188 |
| 2015/0032252 A1* | 1/2015 | Galluzzo ............... | B60P 1/5423 700/218 |
| 2016/0016311 A1* | 1/2016 | Konolige ............... | B25J 9/1664 901/30 |
| 2016/0075031 A1* | 3/2016 | Gotou .................... | B25J 9/1697 700/259 |
| 2016/0089791 A1 | 3/2016 | Bradski et al. | |
| 2017/0203443 A1* | 7/2017 | Lessing ................ | B25J 15/0616 |
| 2018/0104829 A1 | 4/2018 | Altman | |
| 2018/0276501 A1 | 9/2018 | Yamada | |
| 2018/0354121 A1 | 12/2018 | Sezaki | |
| 2019/0061165 A1* | 2/2019 | Rajendran ............. | B25J 13/086 |
| 2019/0217471 A1* | 7/2019 | Romano ............... | B25J 15/0019 |

FOREIGN PATENT DOCUMENTS

| | | |
|---|---|---|
| JP | 2014104524 | 6/2014 |
| JP | 5905549 | 4/2016 |
| JP | 2019005871 | 1/2019 |
| WO | 2011161304 | 12/2011 |
| WO | 2017110499 | 6/2017 |
| WO | 2018017616 | 1/2018 |

* cited by examiner

ROBOTIC HANDLING OF SOFT PRODUCTS IN NON-RIGID PACKAGING

CROSS REFERENCE TO OTHER APPLICATIONS

This application claims priority to U.S. Provisional Patent Application No. 62/809,398 entitled ROBOTIC HANDLING OF SOFT PRODUCTS IN NON-RIGID PACKAGING filed Feb. 22, 2019 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of items use strategies such as packing and unpacking dissimilar items in boxes, crates, containers, conveyor belts, and on pallets, etc. Packing dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.).

In some contexts, items may be so dissimilar in size, weight, density, bulkiness, rigidity, strength of packaging, etc. that any given item or set of items may or may not have attributes that would enable those items to support the size, weight, distribution of weight, etc., of a given other item that might be required to be packed (e.g., in a box, container, pallet, etc. When assembling a pallet or other set of dissimilar items, items must be selected and stacked carefully to ensure the palletized stack does not collapse, lean, or otherwise become unstable (e.g., so as not to be able to be handled by equipment such as a forklift, etc.) and to avoid item damage.

Some products may be subject to being crushed or otherwise damaged and/or may be in flexible packaging. For example, bread and bread-like products may be packaged in plastic bags or similar packaging. A robotic gripper could easily crush the bag and/or product inside. Even slightly crushed product or badly rumpled packaging may render an item less desirable to consumers.

Currently, pallets typically are stacked and/or unpacked by hand. Human workers select items to be stacked, e.g., based on a shipping invoice or manifest, etc., and use human judgment and intuition to select larger and heavier items to place on the bottom, for example. However, in some cases, items simply arrive via a conveyor or other mechanism and/or are selected from bins in an order listed, etc., resulting in an unstable palletized or otherwise packed set.

In the case of bread and other products sold from retail points of sale may need to be distributed to stores in odd lots, e.g., in a specific mix of items and quantity of each ordered by each respective store. Bread products typically are packed by hand into stackable trays, loaded into trucks, and delivered into stores by carrying trays into the store and loading product onto shelves.

Use of robotics is made more challenging in many environments due to the variety of items, variations the order, number, and mix of items to be packed, on a given pallet for example, and a variety of types and location of container and/or feed mechanism from which items must be picked up to be placed on the pallet or other container. In the case of bread and similar products, handling by robots is made more challenging by the need to pick and place arbitrary collections of fragile product items in flexible packaging, such as plastic bags.

BRIEF DESCRIPTION OF THE DRAWINGS

Various embodiments of the invention are disclosed in the following detailed description and the accompanying drawings.

DETAILED DESCRIPTION

Figure 1:
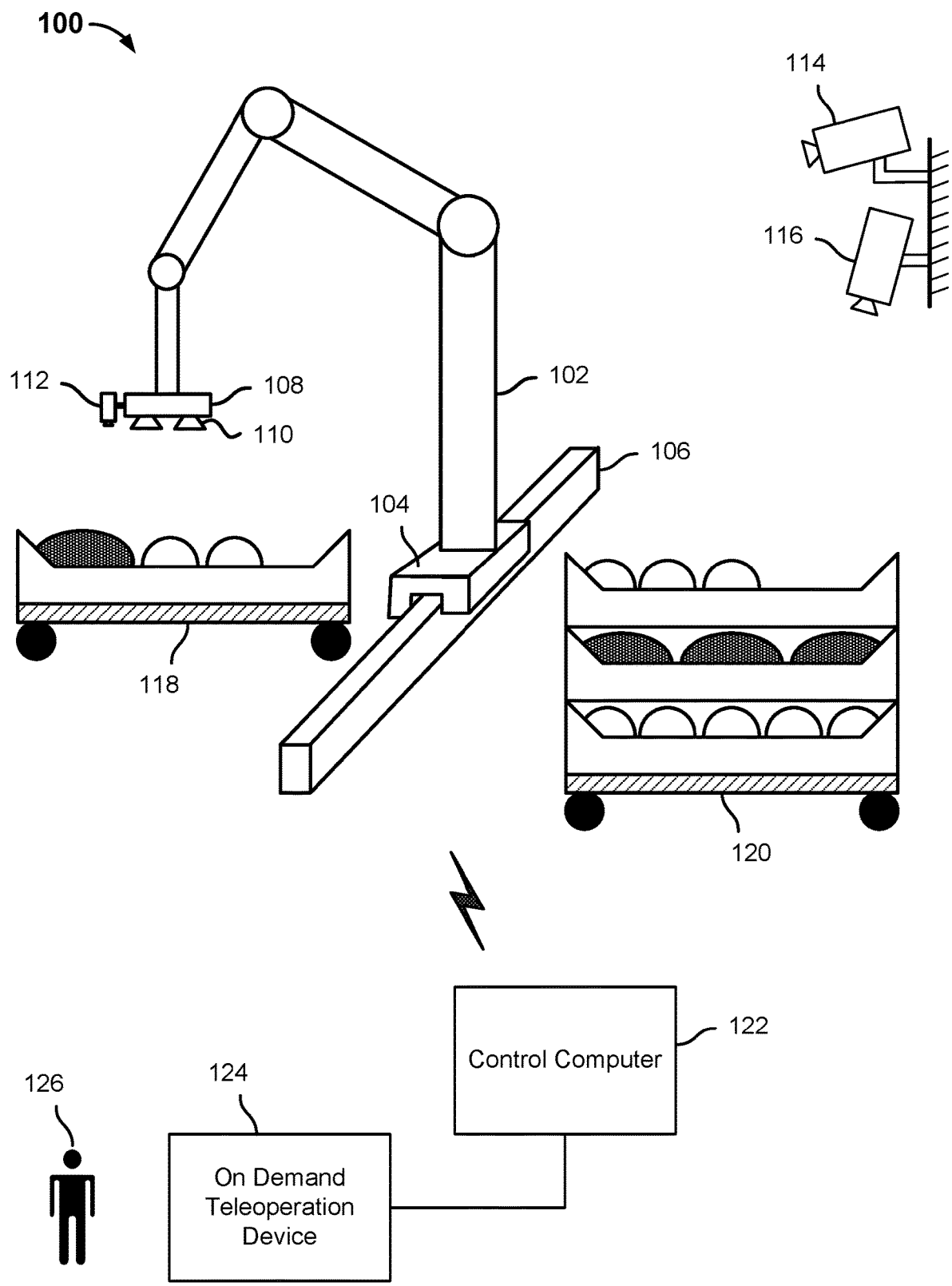
FIG. 1 is a block diagram illustrating an embodiment of a robotic system to handle soft products in non-rigid packaging.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to programmatically use a robotic system comprising one or more robots (e.g., robotic arm with suction and/or gripper at operative end) to palletize/depalletize and/or to otherwise pack and/or unpack arbitrary sets of non-homogeneous items (e.g., dissimilar size, shape, weight, weight distribution, rigidity, fragility, etc.), including items such as bread and similar products sold in plastic bags or similar packaging.

In various embodiments, 3D cameras, force sensors, and other sensors are used to detect and determine attributes of items to be picked and/or placed. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used.

In various embodiments, a library of item types, respective attributes, and grasp strategies is used to determine and implement a strategy to pick and place each item. The library is dynamic in some embodiments. For example, the library may be augmented to add newly-encountered items and/or additional attributes learned about an item, such as grasp strategies that worked or did not work in a given context. In some embodiments, human intervention may be invoked if the robotic system gets stuck. The robotic system may be configured to watch (e.g., using sensors) and learn (e.g., updating a library and/or model) based on how a human teleoperator intervenes to use the robotic arm, for example, to pick and place an item via teleoperation.

In some embodiments, a robotic system as disclosed herein may engage in a process to gather and store (e.g., add to library) attributes and/or strategies to identify and pick/place an item of unknown or newly-discovered type. For example, the system may hold the item at various angles and/or locations to enable 3D cameras and/or other sensors to generate sensor data to augment and/or create a library entry that characterizes the item type and stores a model of how to identify and pick/place items of that type.

In various embodiments, a high level plan to pick and place items on a pallet or other container or location is made. Strategies are applied, e.g., based on sensor information, to implement the plan by picking and placing individual items according to the plan. Deviations from the plan and/or re-planning may be triggered, e.g., the robotic system gets stuck, the stack of items on the pallet is detected (e.g., by computer vision, force sensors, etc.) to have become unstable, etc. A partial plan may be formed based on known information (e.g., next N items visible on a conveyor, next N items on an invoice or manifest, etc.) and adjustments made as additional information is received (e.g., next items visible, etc.). In some cases, the system is configured to stage (e.g., set aside, within reach) items determined less likely to be suitable to be stacked in a layer or container the system is currently building, such as a lower (or higher) layer in a pallet or container, etc. Once more information is known about next items to be picked/placed, a strategy that takes into account the staged (buffered) items and next items is generated and implemented.

In the case of bread and similar products in plastic bags or similar packaging, in various embodiments a robotic system as disclosed herein uses a robotic arm with a suction type gripper at the operative end. For example, in some embodiments a gripper comprising two large suction cups is used. In other embodiments, a single suction cup or more than two suction cups may be included. In various embodiments, bread is picked from conveyors, bins, shelves, etc. and placed in large, stackable plastic trays for distribution. An invoice for each destination may be used to pick and place items.

Algorithms, heuristics, and other programmatic techniques are used, in various embodiments, to generate a plan to pack bread items. For example, items of a same type, size, shape, etc. may be placed together, for efficient packing. In some embodiments, a planner module may attempt to add items to a tray in a manner that minimizes voids, outer perimeter (e.g., sum of edges not adjacent to other product and/or a side of the tray), etc.

In various embodiments, a robotic system to pick and place bread and similar items as disclosed herein may be implemented at least in part using some or all of the techniques illustrated in and/or described in connection with FIGS. 1 through 14.

FIG. 1 is a block diagram illustrating an embodiment of a robotic system to handle soft products in non-rigid packaging. In the example shown, system 100 includes a robotic arm 102 rotatably mounted on a carriage 104 configured to translate, e.g, under computer control, along a rail 106. In this example the robotic arm 102 is movably mounted on carriage 104 and rail 106, but in various other embodiments robotic arm 102 may be stationary or may be a fully or partly mobile other than via translation along a rail, e.g., mounted on a carousel, fully mobile on a motorized chassis, etc.

In the example shown, robotic arm 102 has an end effector 108 at its operative distal end (furthest from the carriage 104). End effector 108 comprises compliant vacuum (or "suction") cups 110. In various embodiments, suction cups 110 comprise silicone or another natural or synthetic material that is durable but also compliant enough to "give" at least slightly when they (first and/or gently) come in contact with an item the robotic system 100 is attempting to use robotic arm 102 and end effector 108 to grasp, e.g., via suction, such as bread or other soft and/or fragile items in non-rigid packaging, such as a plastic bag or wrapping.

In this example, the end effector 108 has a camera 112 mounted on the side of the end effector 108. In other embodiments, the camera 112 may be located more centrally, such as on the downward-facing face of the body of end effector 108 (in the position and orientation shown in FIG. 1). Additional cameras may be mounted elsewhere on robotic arm 102 and/or end effector 108, e.g., on arm segments comprising robotic arm 102. Additionally, cameras 114 and 116, mounted on a wall in this example, provide additional image data usable to construct a 3D view of the scene in which system 100 is located and configured to operate.

In various embodiments, robotic arm 102 is used to position the suction cups 110 of end effector 108 over an item to be picked up, as shown, and a vacuum source provides suction to grasp the item, lift it from its source location, and place it at a destination location.

In the example shown in FIG. 1, robotic arm 102 is configured to be used to pick arbitrary and in this example dissimilar items from source trays 120, such as bread items picked from a tray of items received from a bakery, and place them on a destination tray 118. In the example shown, destination trays 118 and source trays 120 comprise stackable trays configured to be stacked on a base with wheels at the four corners. In some embodiments, the trays 118 and/or 120 may be pushed into position by human workers. In some embodiments, the trays 118 and/or 120 may be stacked on motorized and/or robotically-controlled bases configured to be used to move stacks of bins into position to be picked from and/or placed to and/or to move completed stacks of trays to a staging and/or transport area to be loaded onto delivery vehicles for delivery to retail locations, for example. In some embodiments, other robots not shown in FIG. 1 may be used to push trays 118 and/or 120 into position to be loaded/unloaded and/or into a truck or other destination to be transported, etc.

In various embodiments, 3D or other image data generated by one or more of cameras 112, 114, and 116 may be used to generate a 3D view of the work area of system 100 and items within the work area. The 3D image data may be used to identify items to be picked/placed, such as by color, shape, or other attributes. In various embodiments, one or more of cameras 112, 114, and 116 may be used to read text, logos, photos, drawings, images, markings, barcodes, QR codes, or other encoded and/or graphical information or content visible on and/or comprising items within the work area of system 100.

Referring further to FIG. 1, in the example shown system 100 includes a control computer 122 configured to communicate, in this example via wireless communication (but in one or both of wired and wireless communication in various embodiments) with elements such as robotic arm 102, carriage 104, effector 108, and sensors, such as camera 112, 114, and 116 and/or weight, force, and/or other sensors not shown in FIG. 1. In various embodiments, control computer 122 is configured to use input from sensors, such as camera 112, 114, and 116 and/or weight, force, and/or other sensors not shown in FIG. 1, to view, identify, and determine one or more attributes of items to be loaded into and/or unloaded from trays 120 to trays 118. In various embodiments, control computer 122 uses item model data in a library stored on and/or accessible to control computer 122 to identify an item and/or its attributes, e.g., based on image and/or other sensor data. Control computer 122 uses a model corresponding to an item to determine and implement a plan to stack the item, along with other items, in/on a destination, such as trays 118. In various embodiments, the item attributes and/or model are used to determine a strategy to grasp, move, and place an item in a destination location, e.g., a determined location at which the item is determined to be placed as part of a planning/replanning process to stack items in/on the trays 118.

In the example shown, control computer 122 is connected to an "on demand" teleoperation device 124. In some embodiments, if control computer 122 cannot proceed in a fully automated mode, for example, a strategy to grasp, move, and place an item cannot be determined and/or fails in a manner such that control computer 122 does not have a strategy to complete picking and placing the item in a fully automated mode, then control computer 122 prompts a human user 126 to intervene, e.g., by using teleoperation device 124 to operate one or more of the robotic arm 102, carriage 104, and/or end effector 108 to grasp, move, and place the item.

Figure 2:
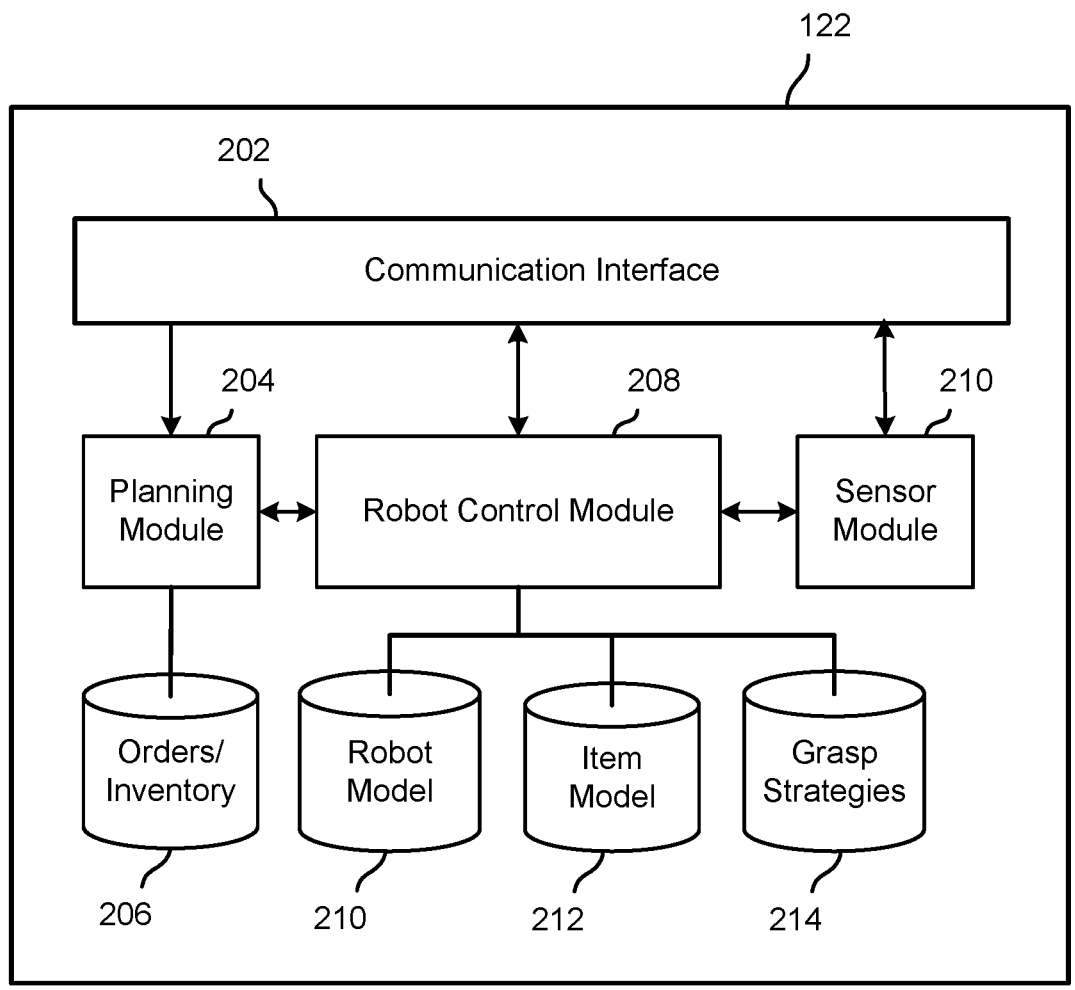
FIG. 2 is a block diagram illustrating an embodiment of a system to control a robotic system.

FIG. 2 is a block diagram illustrating an embodiment of a system to control a robotic system. In various embodiments, control computer 122 of FIG. 1 is implemented as shown in FIG. 2. In the example shown, control computer 122 includes a communication interface 202 configured to send and receive one or more of wireless, network, and other communications between control computer 122 and other elements comprising a robotic system, such as one or more of robotic arm 102, carriage 104, end effector 108, cameras 112, 114, and 116, and/or robotic bases 118 and/or 120, in the system 100 of FIG. 1.

In the example shown, control computer 122 includes a planning module 204. The planning module 204 receives invoice, inventory, spatial/location information (e.g., location and state of robotic elements, sensors, inventory, empty trays/bins, etc.). The planning module 204 uses the information to determine and/or re-compute a plan to pick/place items from source locations to destination locations, e.g., to fulfill one or more high level requirements. For example, in the case of a robotic system to fulfill orders to deliver bread or other baked goods to retail outlets, each according to an invoice or manifest indicating the bread items to be included for each order/retail store, in some embodiments planning module 204 determines a sequence of operations to pick bread items from source trays to fill destination trays according to each order and to cause the trays associated with each order or set of orders to be loaded onto one or more delivery vehicles for transport to the respective retail outlets. All or some of the information received by and/or plans generated by the planning module 206 may be stored in orders/inventory database 206.

In some embodiments, planning module 204 may be configured to develop and/or reassess plans on a rolling and/or periodic basis. For example, image or other sensor data may be received and processed to generate an updated three-dimensional view of the work space scene and/or to update information as to which items of inventory are located in which source locations within the work space. In the bread example, as new trays or stacks of trays arrive in the workspace, e.g., from the bakery, storage, etc., the items are identified and a plan generated, updated, and/or confirmed to make progress toward accomplishing the high level objective (e.g., efficiently fulfill and transport all orders), such as by picking available inventory from current source locations and moving/placing the items in trays being filled to fulfill respective individual orders.

Referring further to FIG. 2, in the example shown, control computer 122 further includes a robot control module 208. In various embodiments, robot control module 208 receives and processes sensor data (e.g., image data from cameras, force and/or torque sensor signals, vacuum/pressure readings, etc.) from sensor module 210. Sensor module 210 receives input from one or more sensors, buffers the data, and provides input to the robot control module 208 in a form usable by robot control module 208 to control operable elements of the controlled robotic system (e.g., system 100 of FIG. 1) to perform tasks associated with implementation of a plan received from planning module 204. In various embodiments, the operable elements include one or more of each sensor and/or actuator comprising a robotic arm and/or end effector, such as robotic arm 102, carriage 104, and end effector 108 of FIG. 1 (e.g., motors to move arm segments, valves or other elements to apply vacuum to suction cups, etc.); other sensors in the workspace, such as cameras 114 and 116 of FIG. 1; and other robotic and/or robotically manipulated or moved elements, such as tray stacks 118 and 120 of FIG. 1.

Robot control module 208 uses a robot model 210 of the robot(s) it is configured to control to control movement and other actuation of each robot. For example, a model of robotic arm 102 and carriage 104 in FIG. 1 may be used to determine an efficient and relatively fluid way to actuate joint motors comprising arm 102, to rotate arm 102 on carriage 104, and/or move carriage 104 along rail 106 to pick and place items from source locations to destination locations, e.g., according to a plan received from planning module 204, without colliding with humans, other robotic elements, or other obstacles present in the workspace.

In various embodiments, robot control module 208 maintains and updates a set of item models 212 and/or grasp strategies 214. Item models 212 in various embodiments describe attributes of items and/or classes or types of items to be picked/placed, such as size, shape, dimensions, weight, rigidity, packaging type, logo or lettering on package, etc. In some embodiments, item models 212 may be used to identify items within the workspace, e.g., based on image, weight, optical code scan, and/or other information.

In various embodiments, the robot control module 208 uses grasp strategies 214 to determine, e.g. based on determined item or item type, size, shape, weight, etc., and context information, such as the location and orientation of an item, what it is adjacent to, etc., a strategy to grasp an item to be moved, e.g., from a source tray to a destination tray.

In various embodiments, the robot control module 208 may update one or both of the item model(s) 212 and grasp strategies 214 over time. For example, in some embodiments, machine learning or other techniques may be used to learn new and/or better grasp strategies over time. For example, grasp strategies that fail frequently may be scored lower and/or removed, and new strategies developed and learned to replace them. In some embodiments, new strategies may be learned by observing how a human operator performs the grasp under teleoperation. Grasp strategies 214 may be specific to an item, set of items, and/or item type(s). Some grasp strategies 214 may be associated with the size, shape, dimension, weight, etc. of an item that is not recognized.

The term "grasp" is used in this disclosure to refer to any mechanism by which an end effector gains control of an item securely enough to be able to move the item, such as by gripping the item in the case of a gripper-type end effector, or by vacuum/suction by an end effector such as end effector 108 of FIG. 1. Techniques disclosed herein may be used with any type of end effector.

In various embodiments, robot control module 208 and/or sensor module 210 receive(s) and process(es) image data to generate a three-dimensional view of a workspace associated with the robotic system controlled by control computer 122 and items present in the workspace. In various embodiments, robot control module 208 and/or sensor module 210 may be configured to control sensors, such as to control the position and orientation of cameras present in the workspace to generate a more complete view of the workspace and items in the workspace.

In various embodiments, control computer 122 may be configured to control, simultaneously, by time share, etc., more than one robotic system in more than one physical location and/or workspace. In some embodiments, the elements shown in FIG. 2 as comprising a single physical computer 122 may be spread across multiple physical or virtual machines, containers, etc.

In various embodiments, one or more of planning module 204, robot control module 208, and sensor module 210 may comprise one or both of specialized hardware (e.g., ASIC, programmed FPGA, etc.) and/or a functional module provided by executing software instructions on a hardware processor comprising control computer 122.

Figure 3:
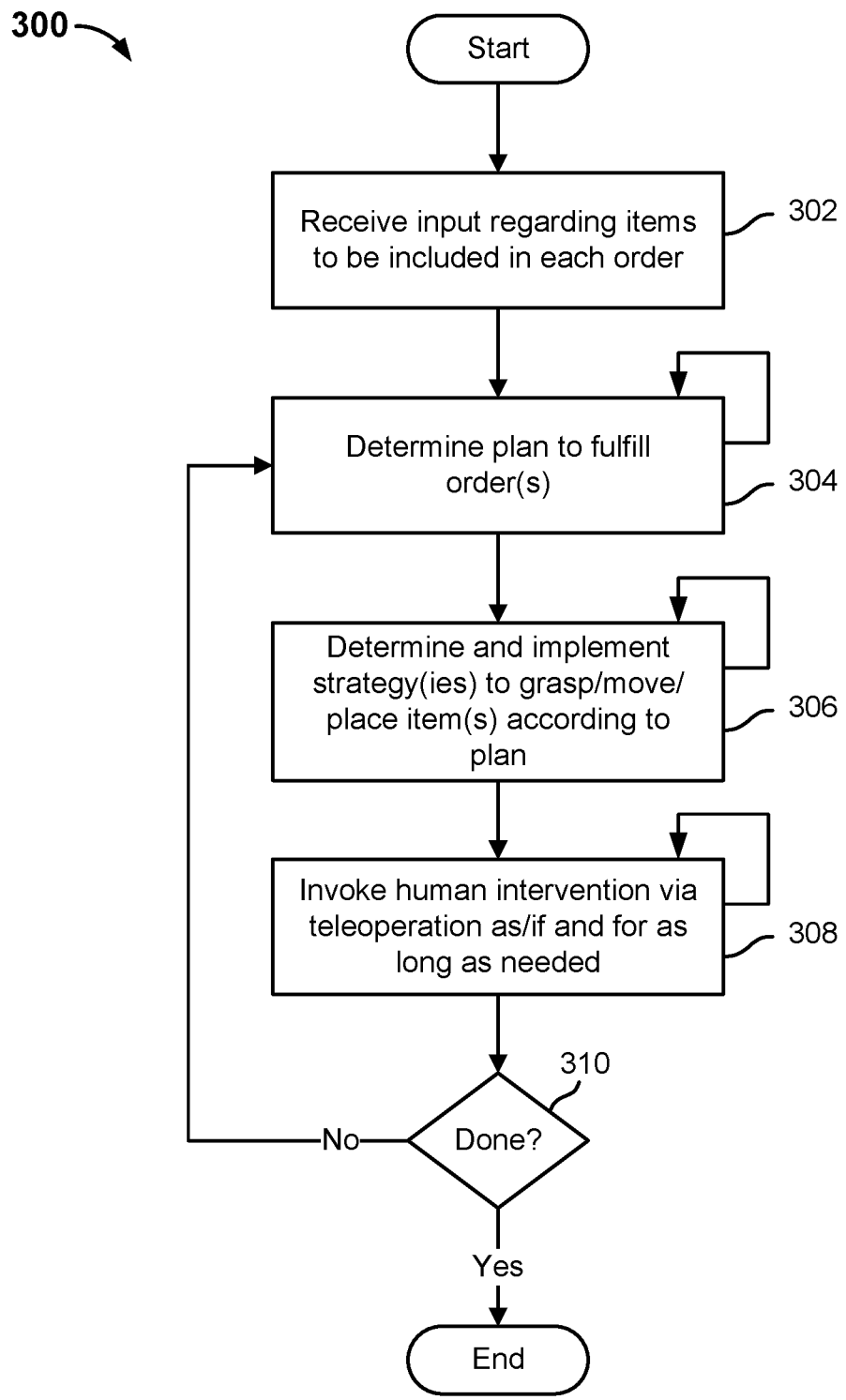
FIG. 3 is a flow chart illustrating an embodiment of a process to control a robotic system.

FIG. 3 is a flow chart illustrating an embodiment of a process to control a robotic system. In various embodiments, the process 300 of FIG. 3 may be implemented by a computer, such as control computer 122 of FIG. 1. In the example shown, at 302, input data indicating a high level objective, such as the items to be included in each of one or more individual orders, is received. At 304, a plan to fulfill one or more of the orders is determined and/or updated. At 306, strategies to grasp, move, and place items according to the plan are determined. At 308, human intervention via teleoperation is invoked, as, if, and for as long as needed, e.g., to perform or complete a task that cannot be completed in a fully automatic mode. Processing continues until all tasks have been completed and the high level objective(s) achieved (310), at which time the process 300 ends.

Figure 4:
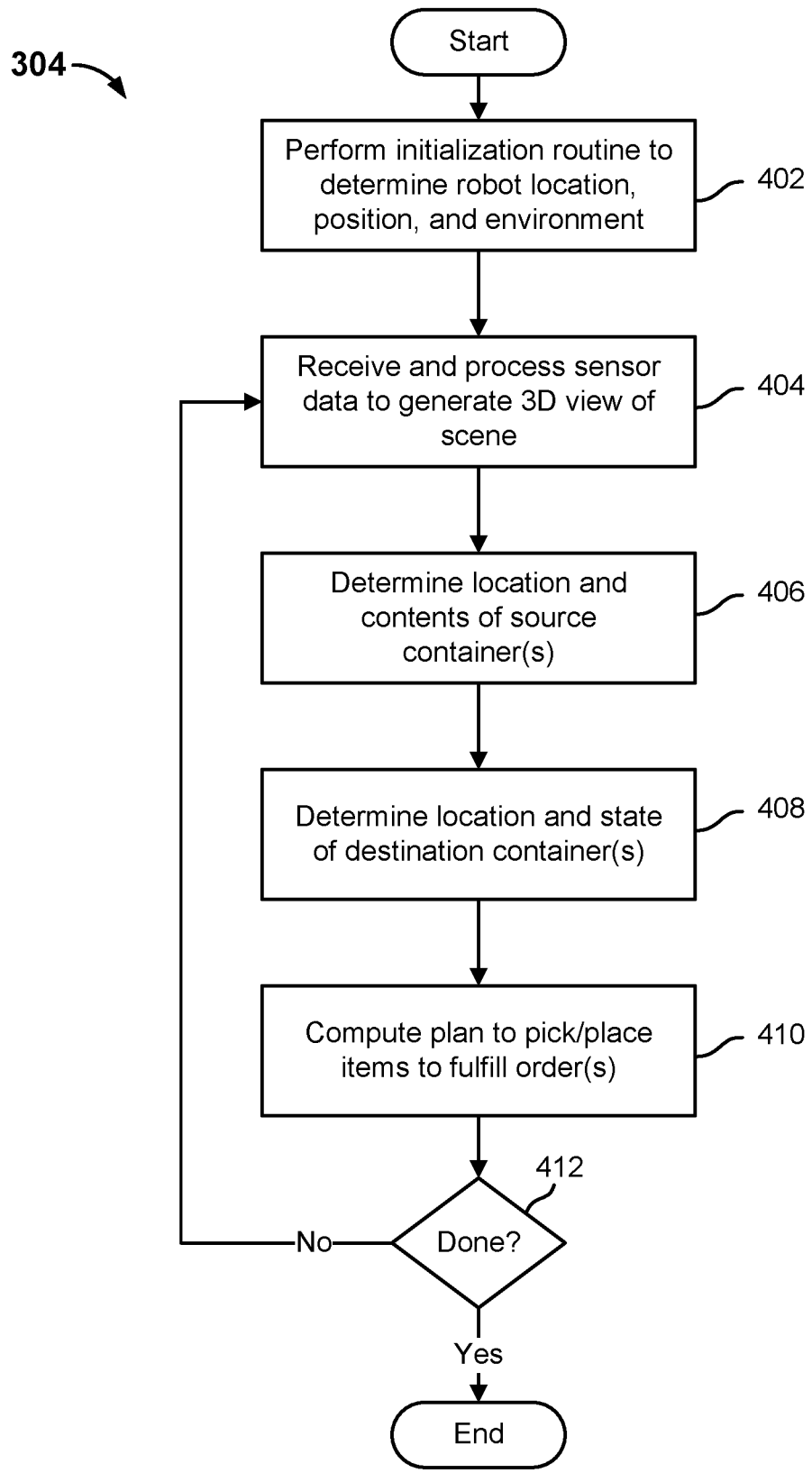
FIG. 4 is a flow chart illustrating an embodiment of a process to determine a plan to use a robot to perform work.

FIG. 4 is a flow chart illustrating an embodiment of a process to determine a plan to use a robot to perform work. In various embodiments, step 304 of FIG. 3 is implemented at least in part by the process of FIG. 4. In the example shown, at 402 an initialization routine and/or operation is performed to determine the location (e.g., in three-dimensional space) and posture/state of each robotic element, along with items, tools, receptacles, obstacles, etc. within the workspace. In some embodiments, 402 may be performed at the start of a set of one or more operations, or when the environment has been changed by human or other robotic intervention, or when data is received indicating re-initialization may be needed, e.g., failed actions, unexpected state, etc. At 404, image and/or other sensor data is received and processed to generate a three-dimensional view of the workspace or other scene or environment. At 406, the location(s) and content(s) of source receptacles, such as trays of bread in the bakery example, is/are determined. For example, one or more of image data, optical code scan, recognizing logos or text on packaging, etc., may be used to determine which items are where. At 408, the location and state of destination receptacles are determined. For example, a stack of empty bins, one or more partially full bins, etc. may be located using image data, RF or other electronic tags, optical codes, or other sensor data. The determined item and receptacle location information, item identification, and other data (e.g., manifest(s) of which items are to be sent to which retail or other point of sale location(s), etc.) are used at 410 to compute (or re-compute) a plan to pick/place items in the workspace to fulfill orders. For example, if one full tray of wheat bread and one full tray of white bread are identified and located in the workspace and an order requires X loaves of wheat bread and Y loaves of white bread, in some embodiments at 410 a plan may be determined to pick and place loaves of wheat and white bread as needed to build one or more trays in which the required number of loaves of each type of bread have been placed.

In various embodiments, the plan determined at 410 includes as required steps to retrieve one or more empty trays, e.g., from a staging or buffer area, and place/stack them as needed in a loading area to enable items to be place in them. Likewise, source trays once empty may be moved by the robotic system to a staging or buffer area, e.g., for future use to fulfill a subsequently-processed order.

In various embodiments, the plan determined at 410 includes determining for each item to be placed a location on a destination tray that is suitable for that item, e.g., is large enough and of the correct dimensions to accommodate the item. In some embodiments, the plan determined at 410 takes into consideration an objective to ensure efficient use of available tray space, e.g., by packing items on each tray in a way that uses an optimal amount of surface space, given the items included in (or left to be picked/placed to fulfill) the order. In various embodiments, the plan may be updated at 410 on a continuous and/or periodic basis. Updated state information may be used to update the plan. For example, the state information may indicate for a given tray which items have already been placed in the tray, the location and orientation of each, the remaining space available in a tray, and the next (or remaining) N items to be placed to fulfill the order.

The process 304 of FIG. 4 continues until the high level operation has been completed and no further tasks remain to be planned (412).

Figure 5:
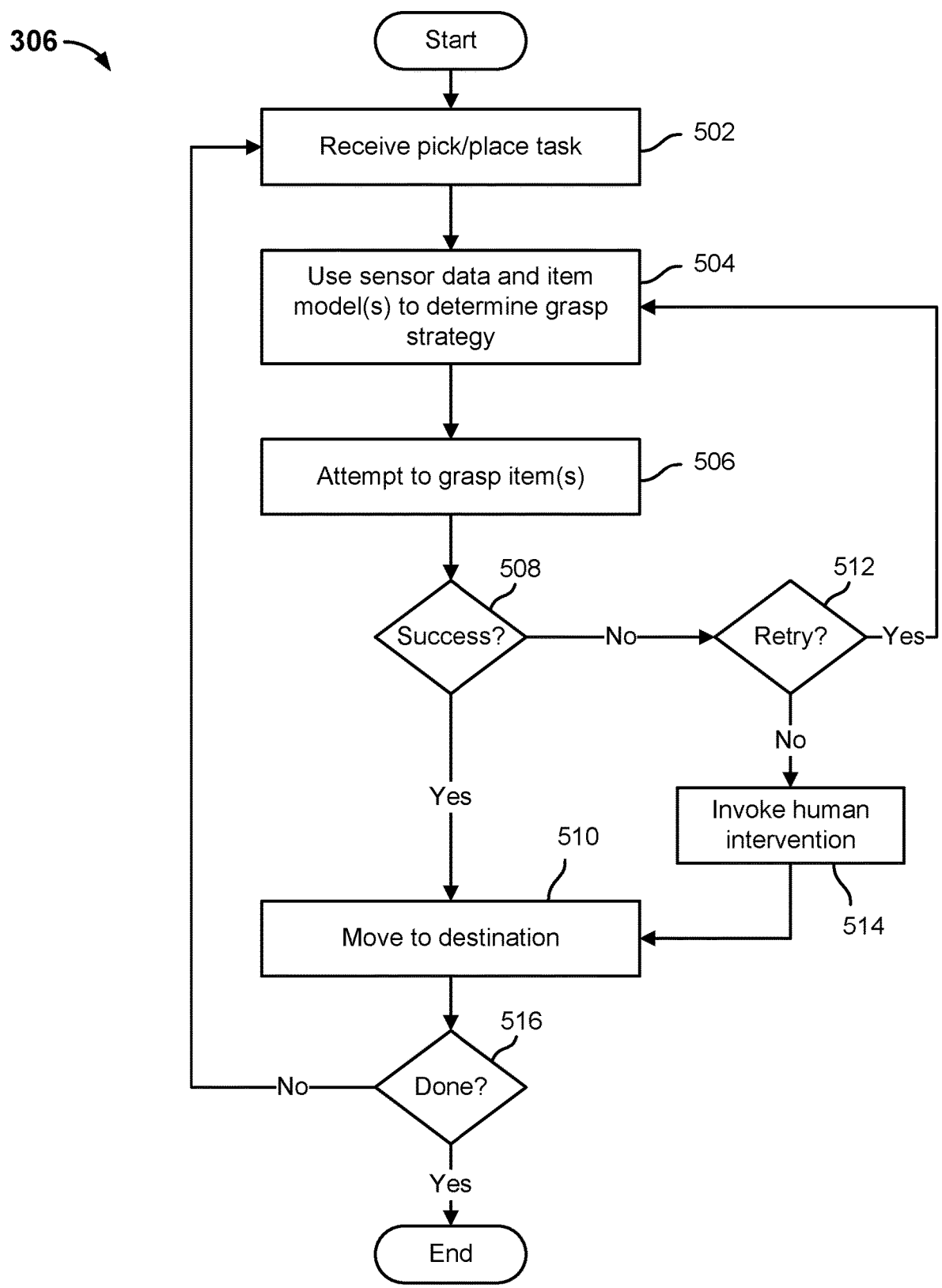
FIG. 5 is a flow chart illustrating an embodiment of a process to use a robot to pick/place items according to a plan.

FIG. 5 is a flow chart illustrating an embodiment of a process to use a robot to pick/place items according to a plan. In various embodiments, step 306 of FIG. 3 is implemented at least in part by the process of FIG. 5. In the example shown, at 502 a pick/place task associated with the plan is received. For example, a robot control module may assign, place in a queue, pull from a queue, etc. a specific pick/place task to be performed to make progress toward completion of a set of one or more higher level operations. At 504, one or more of sensor data, item model information, and grasp strategy repository information are used to determine a strategy to grasp the item to be moved. At 506, an attempt is made to grasp the item according to the strategy. If the grasp is successful (508), e.g., image, weight, and/or other sensor data all indicates the item has been grasped successfully, then at 510 the item is moved to the destination location at which it is to be placed, e.g., according to a previously-determined plan. If the grasp attempt is not successful (508), it is determined at 512 whether to retry the grasp, e.g., using the same or possibly a different strategy. In some embodiments, a retry may be attempted up to a configured or prescribed number of times or until no further strategies are determined to be available to grasp the item under fully automated control, whichever occurs first. If a retry is to be attempted (512), the process returns to step 504, in which one or more of sensor, item model, and grasp strategy information are used to determine at 506 a (next) strategy to grasp the item. If no further retries are to be attempted (512), human intervention (e.g., by teleoperation, manual task performance, etc.) is invoked at 514 and a human worker/operator performs the task to completion (510). Subsequent iterations of the process of FIG. 5 are performed until all items have been picked/placed (516), at which the process ends.

Figure 6A:
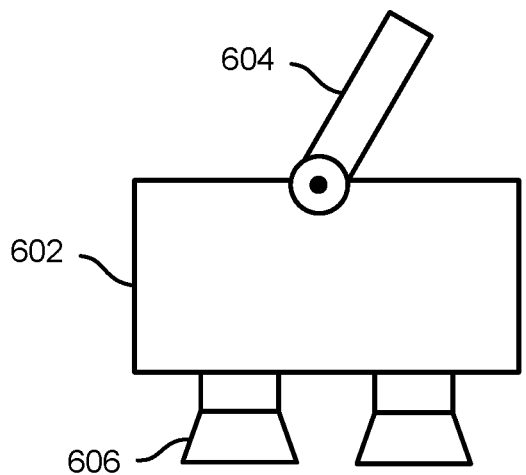
FIG. 6A is a diagram illustrating an embodiment of an end effector comprising a plurality of suction cups.
Figure 6A:
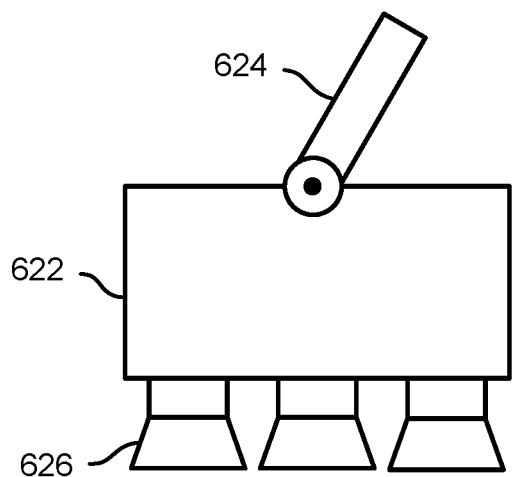
Figure 6A:
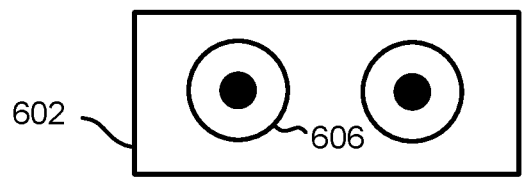

FIG. 6A is a diagram illustrating an embodiment of an end effector comprising a plurality of suction cups. In the example shown, end effector 602 is movably connected to robotic arm segment 604. Arm segment 604 in various embodiments includes internal conduits to provide electrical power and a source of vacuum to the end effector 602. In the example shown, end effector 602 includes two suction cups, including leftmost suction cup 606. In various, end effector 602 includes internal actuator elements, not shown in FIG. 6A, configured to apply suction independently to the left and/or right suction cup. For example, only one suction cup may be used to grasp a smaller item. Or, two items may be grasped simultaneously, each using one independently (or jointly) controlled suction cup. In some embodiments, end effector 602 includes sensors, such as force or other sensors attached to the suction cup mounts, used in various embodiments to detect initial contact with an item to be grasped, and/or to determine (e.g., by weight) what an item is and/or whether an item has been successfully grasped. In some embodiments, end effector 602 includes one or more torque sensors, e.g., attached the "wrist" point at which end effector 602 is connected to arm segment 604. In some embodiments, the torque sensor(s) may be used, for example, to determine whether an item has been grasped at or near its center of gravity. In some embodiments, end effector 602 includes pressure sensors to determine whether a suction cup based grasp of an item has been successful, e.g., by detecting a good or poor seal between the suction cup and the item and/or its packaging.

Figure 6B:
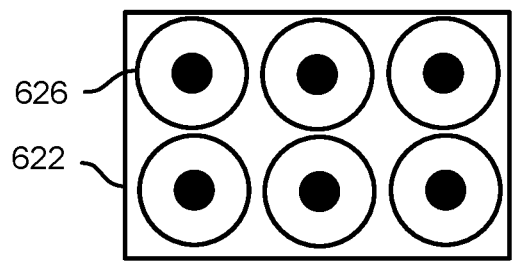
FIG. 6B is a diagram illustrating an embodiment of an end effector comprising a plurality of suction cups.

FIG. 6B is a diagram illustrating an embodiment of an end effector comprising a plurality of suction cups. In the example shown, end effector 622 is movably attached to robotic arm segment 624 and includes six suction cups arranged in a 2×3 grid. In various embodiments, each of the six suctions cups and/or contiguous subgroups of 2 or 3 of them, may be actuated independently under control of a robotic control system as disclosed herein.

Figure 6C:
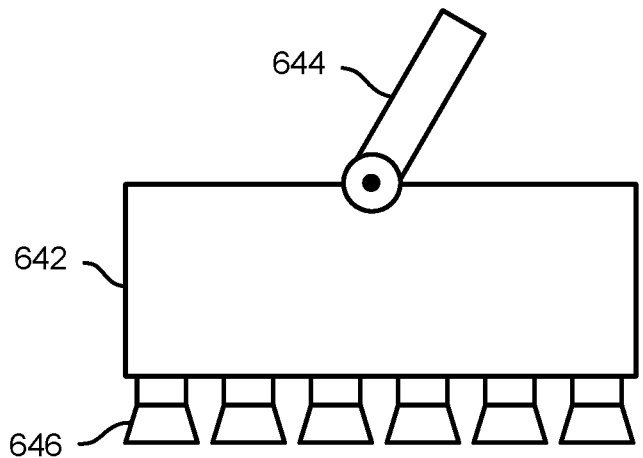
FIG. 6C is a diagram illustrating an embodiment of an end effector comprising a plurality of suction cups.
Figure 6C:
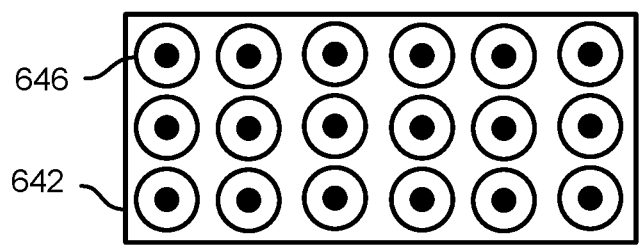

FIG. 6C is a diagram illustrating an embodiment of an end effector comprising a plurality of suction cups. In the example shown, end effector 642 is movably attached to robotic arm segment 644 and includes eighteen suction cups arranged in a 3×6 grid. In various embodiments, each of the suctions cups and/or contiguous subgroups of them may be actuated independently under control of a robotic control system as disclosed herein.

While the examples shown in FIGS. 6A, 6B, and 6C include the number and arrangement of suction cups shown, in various embodiments more or fewer suction cups are included. In some embodiments, grasping structures other than suction cups are included.

Figure 7:
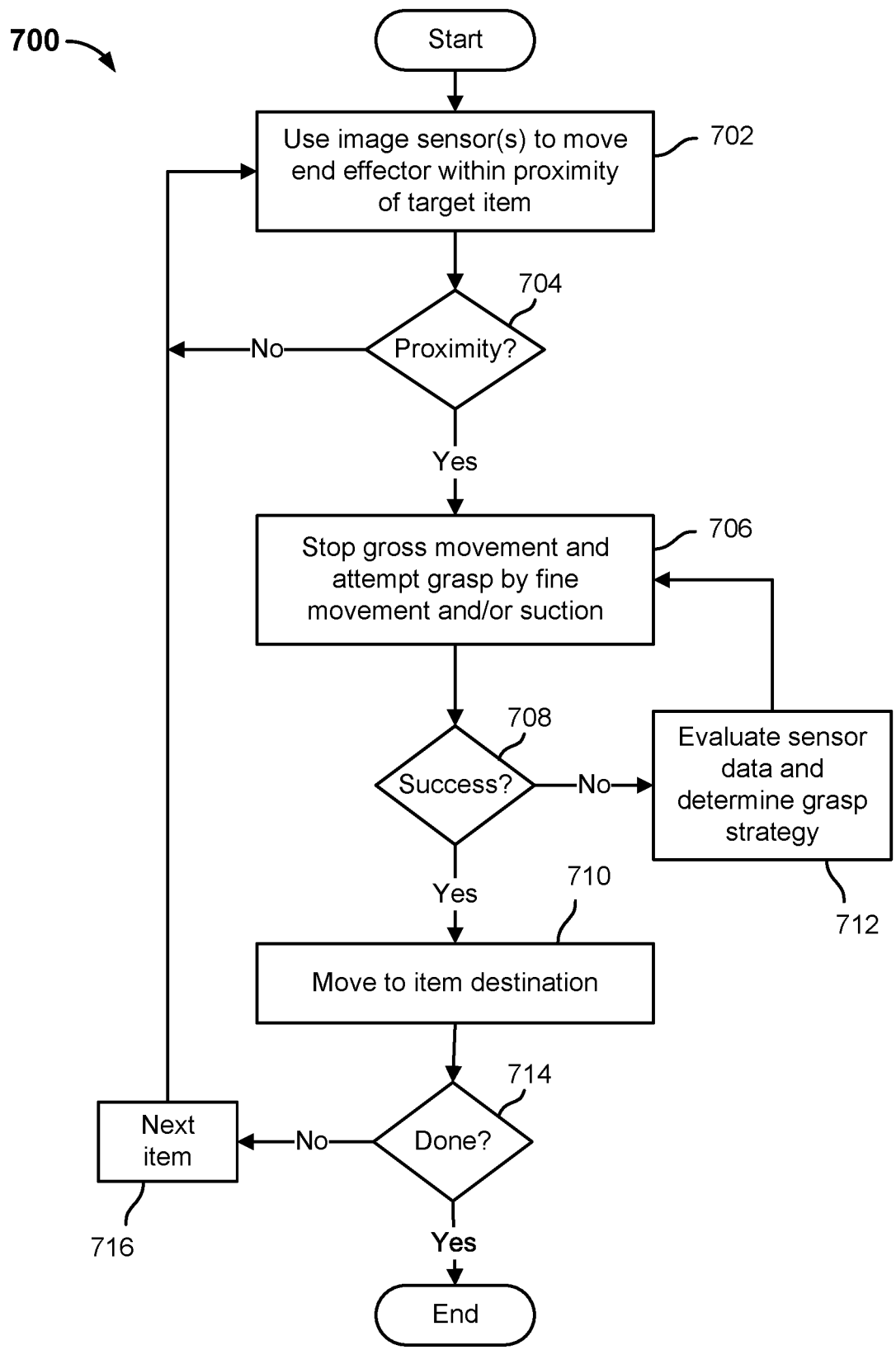
FIG. 7 is a flow chart illustrating an embodiment of a process to grasp items with a robotic arm and end effector.

FIG. 7 is a flow chart illustrating an embodiment of a process to grasp items with a robotic arm and end effector. In various embodiments, the process 700 of FIG. 7 may be performed by a computer, such as control computer 122, configured to operate a robotic arm and end effector, such as robotic arm 102 and end effector 108 of FIG. 1. In some embodiments, the process 700 is performed by robot control module 208 of FIG. 2. In the example shown, at 702 image and/or other sensor data is used to move the end effector within proximity of the item to be grasped. For example, a location in three-dimensional space of the surface of packaging to be engaged by a suction-type end effector is determined based on image data, and a trajectory is computed to move the item-engaging end of the suction cups of the gripper to within a prescribed distance of the surface. Image data continues to be monitored as the end effector is moved to within proximity of the packaging (or item) surface. In various embodiments, movement is stopped once the end effector has been moved to the ending location and orientation of the computed trajectory and/or if image or other sensor data indicates the end effector reaches proximity of the item before the end of the trajectory has been reached; for example, movement may be stopped if force sensors in the end effector detect that the suction cups have contacted the packaging/item. Once the end effector has been moved to a location in proximity of the item to be grasped (702, 704), at 706 gross movement (e.g., of relatively larger distance and/or at relatively higher speed) of the end effector and arm is stopped and the item is attempted to be grasped by one or more of fine movement of the end effector and actuation of the suction or other item engagement mechanism of the end effector.

In various embodiments, one or more of the following may be performed, present, and/or achieved:

Grasp using suction minimizes necessary free space around the item, only the top of the item needs to be accessible.

Compliant suction cups dampen the contact force to protect product (i.e., item being grasped).

Pressure sensors to detect when the cups are in close contact with the surface of the product. In some embodiments and/or grasps, the wrapping may be securely grasped without even touching the contained product.

Force sensors to detect when force is being applied to the product.

Any other combination of sensors to detect two grasp states—(1) end-effector has made enough contact with product for a grasp, and (2) end-effector cannot move any closer without risk of damaging the product. In some embodiments, these sensors can include proximity sensors and/or limit switches on the suction cup mounts.

A closed control loop that moves the robot end-effector towards the product until either state (1) or (2) is encountered from above.

A determination is made at 708 whether the item has been grasped successfully. For example, pressure sensors may be used to determine whether a suction-based grasp has been completed successfully. If a required vacuum has been achieved, for example, a determination may be made that the item has been grasped successfully. In some embodiments, a determination that the item has been grasped successfully may be made based on attributes of the item, such as weight, and whether at vacuum has been achieved with respect to at least a minimum number of suction cups of the end effector, such as a minimum number of cups associated with securely grasping an item of that weight.

If/once the grasp has been determined to be successful (708), at 710 the item is moved to the associated destination location. For example, the robotic arm and end effector are moved along a trajectory computed by a control computer and/or module to move the item to the destination and release the item from the grasp of the end effector. If the grasp is not (yet) successful (708), then at 712 image and/or other sensor data is evaluated to determine a (new/revised) grasp strategy. In some embodiments, step 712 includes an evaluation of whether a (further) retry is to be attempted; if not, human intervention is initiated. If a new grasp strategy is determined at 712, the grasp strategy is attempt at 706, and if successful (708) the item is moved to its destination at 710. Once an item has been moved to its destination (e.g., at 710 and/or by human intervention if automated grasping/movement has failed), a determination is made at 714 whether there are further items to be grasped and moved. If so, at 716 processing advances to the next item to be moved, and a further iteration of the process 700 is performed with respect to that item. If there are no other items to be grasped and moved (714), the process ends.

Figure 8:
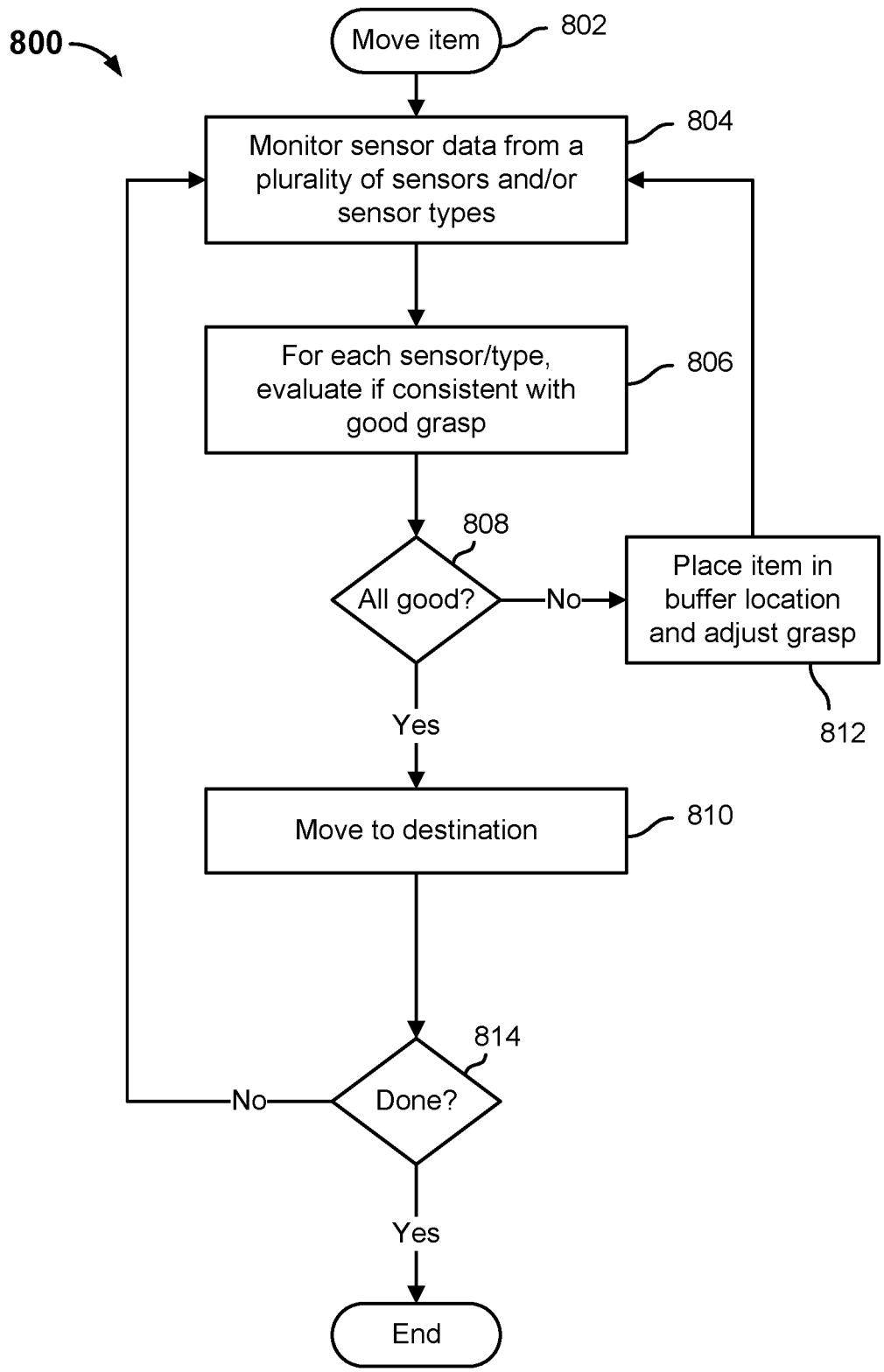
FIG. 8 is a flow chart illustrating an embodiment of a process to securely move to a destination an item that has been grasped by a robotic arm and/or end effector.

FIG. 8 is a flow chart illustrating an embodiment of a process to securely move to a destination an item that has been grasped by a robotic arm and/or end effector. In various embodiments, the process 800 of FIG. 8 may be performed by a computer, such as control computer 122, configured to operate a robotic arm and end effector, such as robotic arm 102 and end effector 108 of FIG. 1. In some embodiments, the process 800 is performed by robot control module 208 of FIG. 2.

In various embodiments, a robotic system grasps an item, e.g., via the process 700 of FIG. 7, then employs one or more sensor-based checks to ensure that the grasp is and remains correct and secure, for example the robotic system may:

Query a database of SKU-specific or other item information, e.g., to determine item weight and/or other attributes.

Check pressure sensor readings for air leaks that weaken the grasp.

Check force sensor readings to ensure the correct type and quantity of items have been grasped.

Camera detects position of grasped items relative to the end-effector to corroborate the readings from pressure and force sensors. Confirms that the size of the grasped item matches the size in the SKU or other item database.

Torque readings check that item has been grasped near center of mass.

Upon any (or greater than threshold) discrepancy between sensor readings or failure of any checks, robot returns the grasped object to its original location or to some nearby "safe" zone for further attempts/inspection. Then it may continue picking (e.g., other) products.

Referring to FIG. 8, in the example shown, while an item is being moved (802), e.g., after being grasped successfully using a robotic arm and end effector, at 804 sensor data from a plurality of sensors and/or sensor types (e.g., image, force, pressure, etc.) is monitored. For each sensor/sensor type, at 806 the sensor data is evaluated to determine whether the data is consistent with a (continued) secure grasp of the item. If all (or a threshold proportion) sensors indicate the grasp remains secure (808), at 810 the item is moved (and/or continues to be moved) to its destination. If any (or a threshold number of) sensors and/or types of sensor provide data indicating the grasp is not secure or is no longer secure (808), at 812 the item is moved to a buffer location (or its original source location, if the robotic system determines the grasp is secure enough and/or the source location near enough to do so), and once in the safe location the robotic system determines a grasp strategy and attempts to re-grasp the item. Monitoring of the plurality of sensors (804) and use of sensor data to evaluate whether the grasp is/remains secure (806, 808) continues until the item has been moved successfully to its destination (814), upon which the process 800 ends.

Figure 9:
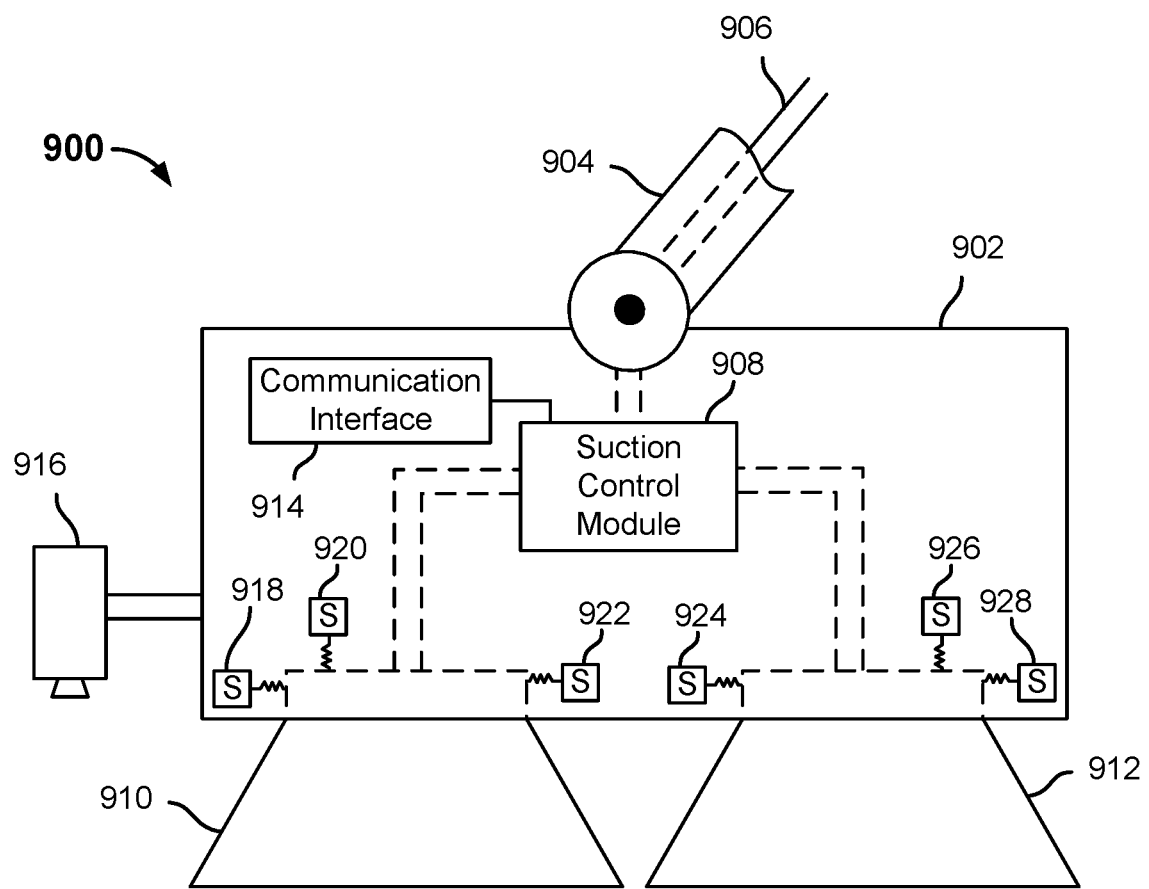
FIG. 9 is a block diagram illustrating an embodiment of a suction-based end effector.

FIG. 9 is a block diagram illustrating an embodiment of a suction-based end effector. In various embodiments, robotic arm end effector 900 of FIG. 9 may be used to implement end effector 108 of FIG. 1.

In the example shown, end effector 900 includes a body or housing 902 attached to robotic arm 904 via a rotatable coupling. In some embodiments, the connection between housing 902 and robotic arm 904 may comprise a motorized joint controlled by a control computer, such as control computer 118 of FIG. 1. End effector 900 further includes a suction or other pneumatic line 906 that runs through the robotic arm 904 into the housing 902 to supply a vacuum source to suction control module 908. In various embodiments, control module 908 is connected, e.g., via wireless and/or wired communication through communication interface 914 to a control computer external to end effector 900, e.g., control computer 118 of FIG. 1. The control module 908 includes electronic and/or electro-mechanical elements operable to supply suction force to suction cups 910, 912 comprising the end effector 900, e.g., to attach the end effector through suction to an item to be picked up, moved, and placed using end effector 900.

In various embodiments, suction control module 908 is configured to apply suction to cups 910 and 912 independently, enabling only one or the other to be used to grasp a given item. In some embodiments, two adjacent items, such as two loaves of bread, may be grasped and moved simultaneously, each being grasped by a corresponding one of cups 910 and 912.

In the example shown, a camera 916 mounted on the side of housing 902 provides image data of a field of view below the end effector 900. A plurality of force sensors 918, 920, 922, 924, 926, and 928 measure force applied to the suction cups 910 and 912, respectively. In various embodiments, the force measurements are communicated via communication interface 914 to an external and/or remote control computer. The sensor readings are used in various embodiments to enable the robotic arm 904 and end effector 900 to be used to snug an item into place adjacent to other items and/or sidewalls or other structures, and/or to detect instability (e.g., insufficient push back with the item is pressed down upon while still under suction but in the place in which the item was expected to be placed and to be stable). In various embodiments, the horizontally mounted pairs of force sensors (e.g., 918 and 922, 924 and 928) are placed at right angles in the x-y plane, to enable force to be determined in all horizontal directions.

In some embodiments, force sensors may be used to detect initial contact between suction cups 910, 912 and an item to be grasped. The robotic arm 904 is stopped upon initial contact being detected, to avoid damage to the item, such as crushing a loaf of bread or rumpling its packaging. Suction is then applied to grasp the item using suction.

Figure 10:
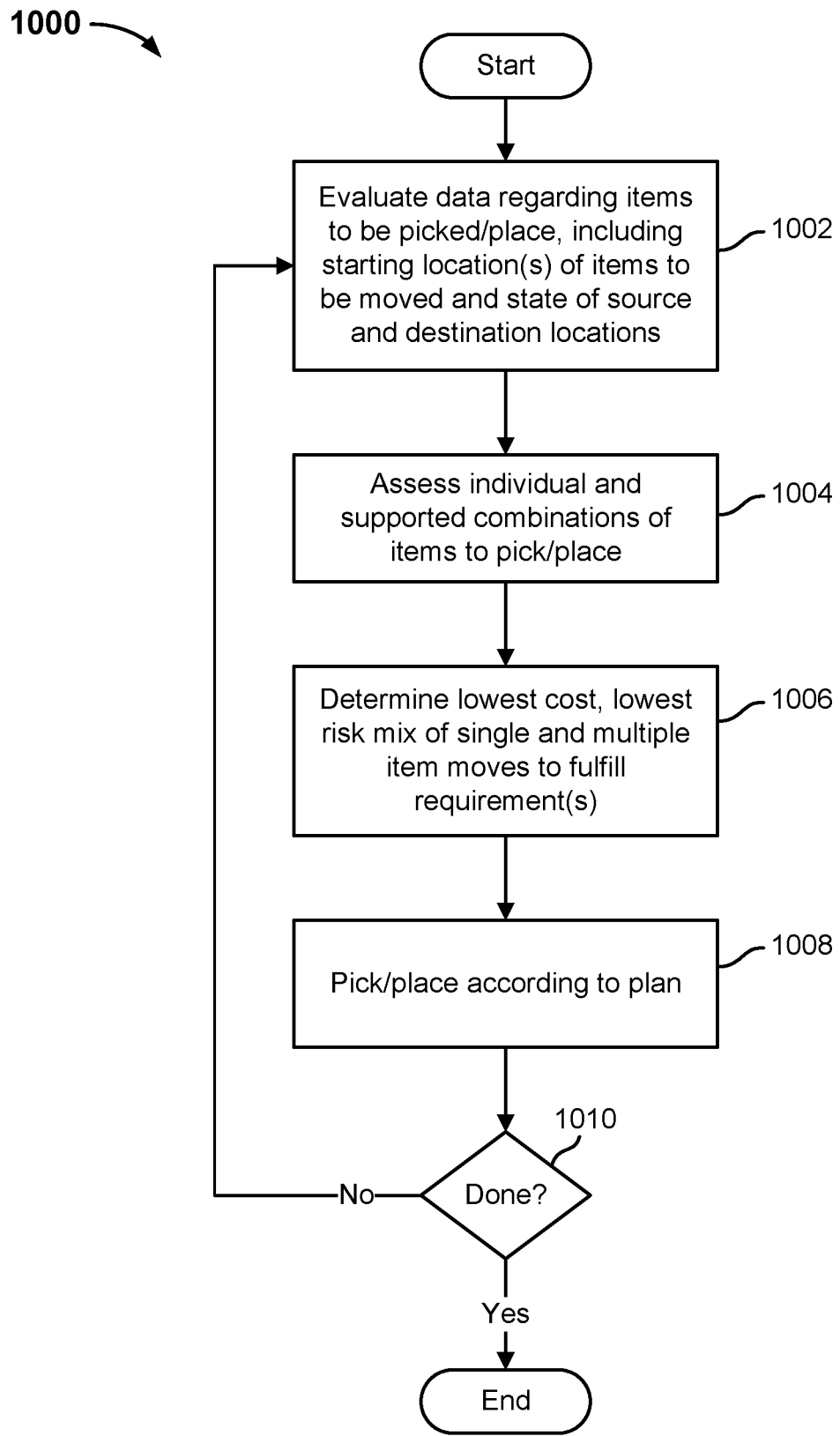
FIG. 10 is a flow chart illustrating an embodiment of a process to simultaneously pick/place items as/if needed to best achieve an objective assigned to a robotic system.

FIG. 10 is a flow chart illustrating an embodiment of a process to simultaneously pick/place items as/if needed to best achieve an objective assigned to a robotic system. In various embodiments, the process 1000 of FIG. 10 may be performed by a computer, such as control computer 122, configured to operate a robotic arm and end effector, such as robotic arm 102 and end effector 108 of FIG. 1. In some embodiments, the process 1000 is performed by robot control module 208 of FIG. 2.

In various embodiments, a robotic system as disclosed herein may:

Pick multiple items in one run to increase the throughput of the picking system.
Generate different pick (grasp) pose for different item combinations.
Detect pickable item combinations that fit into the current end effector configuration for a secured tight grasp. For example, gripper (end effector) with two big suction cups may pick up two of the same or similarly-sized items at the same time.
Among all pickable items, decide whether to perform multi-grasping based on current quantity of customer needs (e.g., current manifest).
Adapt to different system conditions to perform the multi-grasp in a safe manner. For example, if an item lies on the edge of the workzone, make adjustment to the gripper pose to accommodate possible collisions. Identify and filter out potential dangerous cases.
Adapt to different gripper configurations: evaluate multi-grasp feasibility and generate different grasp pose based on given gripper configuration, such as diameter between gripper entry points, etc.
Perform cost evaluation between possible single and multi-grasps.
Evaluate grasp cost for all possible multi-grasps, to achieve lowest risk in stable multi-grasping.

Referring to FIG. 10, in the example shown at 1002 item data, e.g., item attribute data, quantities of each item needed for fill current/next order, source/starting location(s) of items to be moved, state of source and destination locations (e.g., trays), etc. is evaluated. Single-item and supported multi-item combinations of items that could be picked and place as part of a set of actions to fill an order are assessed at 1004. For example, if two or more of a same item are required to fill an order and adjacent items are present in the source tray and room is available (or, under a scenario being evaluated in planning would or could be made available), then moving two (or more) of the items in a single task may be considered to be included in the plan to fill the order. At 1006, the lowest (overall/total) cost (e.g., time, energy, etc.) and/or lowest risk (e.g., the risk of dropping items may be considered to be greater by a measurable or predictable amount than moving items one by one) mix of single-item and/or multi-item pick/place tasks to fill an order is determined. In some embodiments, each of cost and risk may have an associated weighting, e.g., in a cost function, and a plan that minimizes the cost function may be determined. At 1008, items are picked/placed according to the plan determined at 1006. Processing continues until done (1010).

In various embodiments, one or more of the steps of process 1000 may be performed on a continuous and/or periodic basis, e.g., to refine the plan determined at 1006 based on information that becomes available while the plan is being performed, such as a new source tray or other source receptacle of items being moved into the work space, human or other unexpected intervention or events changing the state of any items and/or receptacles in the work space, failed pick/place tasks resulting actual state (e.g., of a destination) tray being different than expected, etc.

Figure 11:
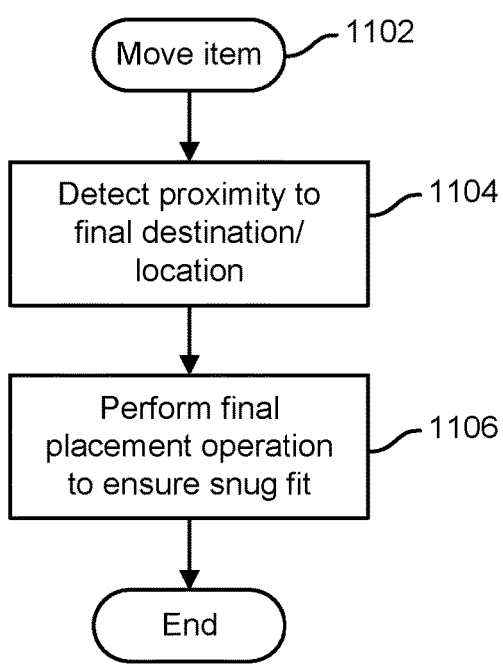
FIG. 11 is a flow chart illustrating an embodiment of a process to adjust final placement of an item.

FIG. 11 is a flow chart illustrating an embodiment of a process to adjust final placement of an item. In various embodiments, the process of FIG. 11 may be performed by a computer, such as control computer 122, configured to operate a robotic arm and end effector, such as robotic arm 102 and end effector 108 of FIG. 1. In some embodiments, the process of FIG. 11 is performed by robot control module 208 of FIG. 2. In the example shown, when an item is being move (1102) the system detects the item has been moved to a location in close proximity to the intended destination location (1104). For example, image sensors, force sensors, and/or other sensor data may be used to detect proximity to the final location. In some embodiments, vertically oriented force sensors may be used to detect that the item has come in contact with the tray bottom or other receptacle surface on which the item is to be placed. At 1106, in response to detecting proximity to the final destination location, prior to the item being release, a final placement operation is performed to ensure a snug fit. For example, horizontal or other force sensors, torque sensors, contact sensors, image sensors, or some combination thereof may be used to assess item contact or near contact with adjacent items and/or structures, such as a sidewall of a receptacle. The robotic arm and/or end effector may be manipulated to increase adjacency, such as by ensuring the item as placed is in contact along any edges and/or surfaces at which it should be snug against an adjacent item according to pick/place plan. If force sensor readings of sensors associated with a same horizontal access and/or contact edge or surface of the item are not (substantially) the same, for example, the end effector may be rotated and/or the arm moved to reposition the item to a position in which the force sensors sense substantially the same force.

Figure 12:
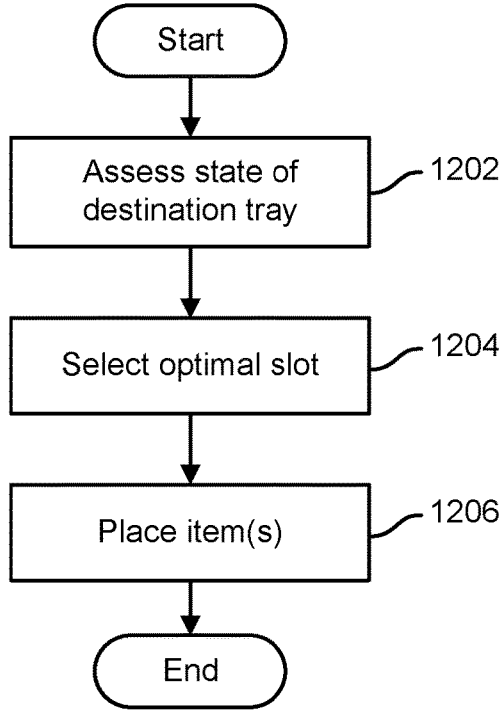
FIG. 12 is a flow chart illustrating an embodiment of a process to select a destination location for an item.

FIG. 12 is a flow chart illustrating an embodiment of a process to select a destination location for an item. In various embodiments, the process of FIG. 12 may be performed by a computer, such as control computer 122, configured to operate a robotic arm and end effector, such as robotic arm 102 and end effector 108 of FIG. 1. In some embodiments, the process of FIG. 12 is performed by robot control module 208 of FIG. 2. In the example shown, at 1202 the state of a destination tray to which an item or items is/are to be moved is assessed. For example, image data and data of previously performed pick/place tasks may be used to determine available slots, space, and/or locations available to receive an item to be placed on the destination tray or other receptacle. At 1204, an optimal slot is selected from those determined at 1202 to be available.

In some embodiments, an optimal slot may be selected according to an algorithm and/or other criteria. For example, in some embodiments a slot that would result in the lowest outer perimeter length for the group of items in the destination tray may be selected. In some embodiments, slots for the next N items to be placed may be determined simultaneously, if information about the N items is available, to ensure the collective set of placement locations is optimal. In some embodiments, if a prior placement decision impacts the availability and/or optimality of a subsequent placement decision, the item placed previously may be moved to a location and/or orientation determined programmatically to make a (more optimal) slot available for the next item(s) to be placed. For example, a decision to place first item may be made before the system knows which item(s) is/are to be placed next and/or before the system has complete information about such item(s). In such a condition, the system may have selected a placement for the previously-placed item that results in an overall less optimal situation given the items to be placed subsequently. In some embodiments, the system is configured to detect such a situation and to move and/or change the placement/orientation of the previously place item, if doing so opens more/better possibilities for the item(s) to be place next or later.

In some embodiments, if at 1202 and/or 1204 it is determined that no slot is available to receive the item, and in some embodiments if no smaller item(s) that might fit in the tray are available to be picked/placed into space that is available and sufficient to receive such items, the system determines the tray is full and retrieves an empty tray, e.g., from a staging area. If the tray stack is not too high and the trays that have been filled and the new tray that is to be filled next are destined for the same location, e.g., the same delivery vehicle/route, the new tray may be stacked on the tray that has been determined to be full.

At 1206, once a suitable/optimal slot has been selected to place the item(s), the item(s) is/are place in that location, e.g., via the processes of one or more of FIGS. 7 and 11.

Figure 13:
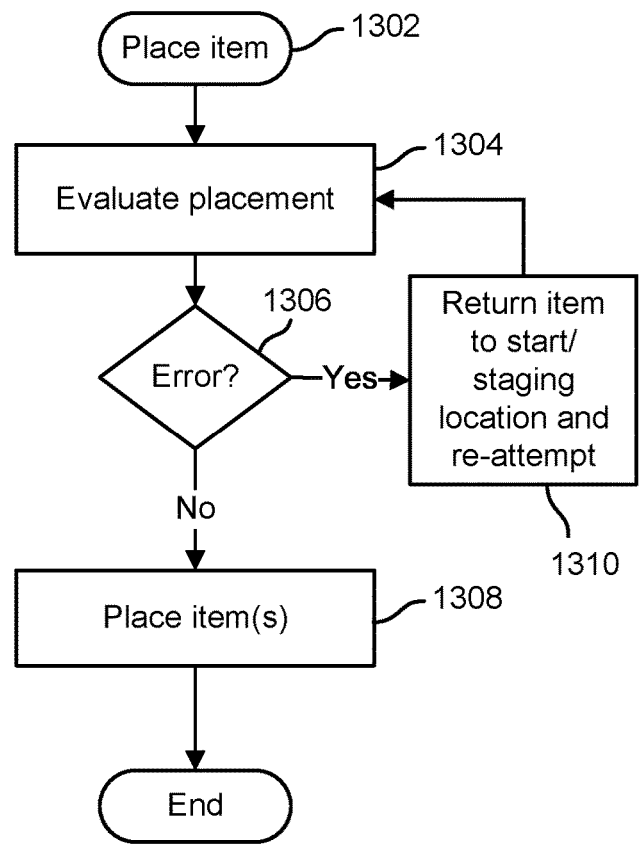
FIG. 13 is a flow chart illustrating an embodiment of a process to detect misplacement of an item.

FIG. 13 is a flow chart illustrating an embodiment of a process to detect misplacement of an item. In various embodiments, the process of FIG. 13 may be performed by a computer, such as control computer 122, configured to operate a robotic arm and end effector, such as robotic arm 102 and end effector 108 of FIG. 1. In some embodiments, the process of FIG. 13 is performed by robot control module 208 of FIG. 2. In the example shown, when an item is placed (1302), e.g., moved and snugged into final location but not yet released from the grasp of the end effector, image and/or other sensor data is used to evaluate placement of the item (1304). For example, three-dimensional image data may indicate the item height is higher than expected for a successful placement. For example, the height of the top surface of the item may be expected to be equal to the tray bottom height plus the expected height of the item. If the top surface is at a higher height, such information may indicate the item has been placed wholly or partly on top of another item, or the item may have been squished or otherwise deformed during the pick/place operation, or the wrong item may have been placed, etc. If no error is detected (1306), the item is released from the grasp (1308) and the arm and end effector are moved away to perform the next pick/place task. If an error is detected (1306), at 1310 the item is returned to the start location, or in some embodiments another staging or buffer area, and the pick/place operation is attempted again. In some embodiments, repeated attempts to pick/place an item that result in an error being detected may trigger an alert and/or other action to initiate human intervention.

Figure 14:
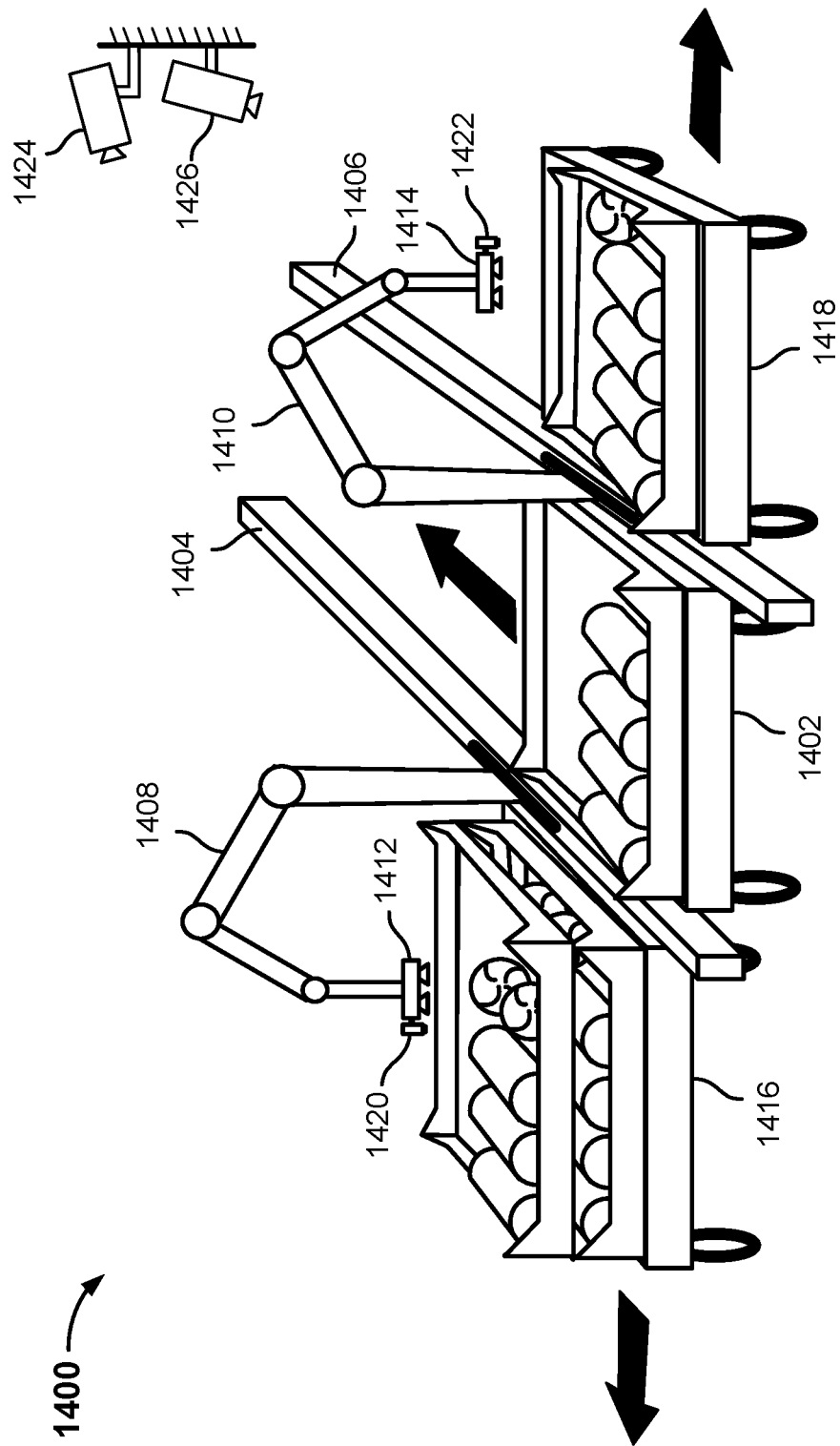
FIG. 14 is a diagram illustrating an embodiment of a robotic system to handle soft products in non-rigid packaging.

FIG. 14 is a diagram illustrating an embodiment of a robotic system to handle soft products in non-rigid packaging. In the example shown, system 1400 includes robotic arms 1408 and 1410 mounted to move under computer control along rails 1404 and 1406, respectively. Robotic arms 1408 and 1410 terminate in suction-type end effectors 1412 and 1414, respectively. In various embodiments, robotic arms 1408 and 1410 and end effectors 1412 and 1414 are controlled by a robotic control system comprising a control computer, such as control computer 122 of FIGS. 1 and 2.

In the example shown in FIG. 14, robotic arms 1408 and 1410 and end effectors 1412 and 1414 are used to move items, such as loaves of bread, from source trays on a wheeled base 1402 to destination trays on wheeled bases 1416 and 1418. In various embodiments, a human and/or robot may position the source trays and wheel base 1402 into a starting location between rails 1404 and 1406, as shown. Wheeled base 1402 may be advanced through the channel formed by rails 1404 and 1406, e.g., in the direction of the arrow starting at the far end of base 1402 as shown. In various embodiments, base 1402 may be advanced using one or both of the robotic arms 1408 and 1410; by being manually pushed by one or more human operators, one or more fixed or non-fixed robots, etc.; a conveyor belt or chain type mechanism running along and/or between the rails 1404 and 1406; a robotically controlled propulsion and/or conveyance mechanism incorporate into the base 1402, such as computer-controlled motorized wheels and braking; etc.

As the wheeled base 1402 advances along/between rails 1404 and 1406, and/or while base 1402 is temporarily in a stationary position between rails 1404 and 1406, in various embodiments the robotic system uses robotic arms 1408 and 1410 and end effectors 1412 and 1414 are used to move items, such as loaves of bread, from source trays on a wheeled base 1402 to destination trays on wheeled bases 1416 and 1418 according to a plan. For example, the plan may be computed based on inventory and/or sensor data indicating which type(s) of bread is/are available in the source trays on base 1402 and/or on other bases in the work area and further based on manifests or other data indicating which mix of bread or other items are to be placed in destination trays for delivery to which respective ultimate delivery locations, such as retail stores.

In the example shown, once destination trays on bases 1416 and 1418 have been filled, bases 1416 and 1418 are moved outwardly away from the rails 1404 and 1406, respectively, for example to staging and loading areas to be loaded onto delivery vehicles.

While in FIG. 14 a single set of source trays on a single base 1402 are shown, in various embodiments depending on the high level operation being performed one or more additional bases, each having zero or more trays full of items stacked thereon, may be located between rails 1404 and 1406 and/or in a staging area nearby. Likewise, in some embodiments multiple sets of destination trays, each on a corresponding wheeled base, may be stage adjacent to rail 1404 or rail 1406, and the topmost tray on each may be in the process of being filled simultaneously and/or in turn, e.g., according to a manifest and associated fulfillment plan.

In various embodiments, once a source tray is emptied, the system may use robotic arms 1408 and/or 1410 to move the tray to a staging area and/or to the top of a stack of destination trays, thereby creating a supply of trays to be filled and sent to end destinations and/or exposing a next source tray from which items can be picked to fulfill an order.

While in FIG. 14 a single robotic arm (1408, 1410) is disposed on each rail (1404, 1406), in some embodiments two or more robotic arms may be provided on each rail. IN some embodiments, two robotic arms on a single rail may be used to pick up and move empty trays. For example, each may be used to engage an opposite side of the tray, mechanically by engaging a structure of the tray or by suction or gripping in various embodiments, and the two arms may be operated cooperatively to maintain control of the empty tray while moving it to a new location, such as a buffer or staging area or the top of a stack of destination trays. In some embodiments, one or more robotic arms may be used to move a full or partly full tray from the top of a stack, e.g., to be moved to a staging area, to expose a tray lower in the stack, such as to add additional items, rearrange items according to a new or revised plan, etc.

Cameras 1420 and 1422, mounted on end effectors 1412 and 1414, respectively, and/or camera 1424 and 1426 are used in various embodiments to generate image data to plan and perform pick/place operations as disclosed herein.

In various embodiments, techniques disclosed herein enable soft or otherwise fragile products in non-rigid packaging, such as loaves of bread packaged in plastic bags or wrap, to be handled by a robotic system without damaging the items that are handled. For example, in various embodiments, bread may be identified, selected, and moved robotically from source trays received from a bakery or storage area to destination trays for delivery to corresponding specific locations, such as retail stores, with minimal or no human intervention. In various embodiments, techniques disclosed herein increase throughput and efficiency, e.g., compared to a purely human and/or not fully automated operation, of a distribution system, facility, and processes for bread or other fragile items in soft packaging.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
a communication interface; and
a processor coupled to the communication interface and configured to:
receive via the communication interface sensor data associated with a workspace in which one or more robotic elements controlled at least in part by the robotic system are present, wherein the sensor data is received from a plurality of different types of sensors;
determine based at least in part on the sensor data an action to be performed in the workspace using one or more of the robotic elements, the action including moving an end effector of a robotic element of the one or more robotic elements to a location within a prescribed distance of a surface of an item to be grasped; monitoring the sensor data to determine that the end effector has reached the location within the prescribed distance of the surface of the item; stopping gross movement of the end effector based at least in part on the determination that the end effector has reached the location within the prescribed distance of the surface of the item; actuating a grasping mechanism of the end effector, subsequent to stopping gross movement of the end effector, to grasp the item using an amount of force and structures associated with minimized risk of damage to one or both of the item and its packaging; and using sensor data generated by the plurality of different types of sensors subsequent to the item being grasped to ensure the item has been grasped securely at least in part by determining whether sensor data generated by a threshold proportion of the different types of sensors indicates the grasp of the item remains secure and moving the item to a buffer location in response to determining that the sensor data generated by the threshold proportion of the different types of sensors does not indicate that the grasp of the item remains secure; and
send control communications to the robotic element via the communication interface to cause the robotic element to perform the action.

2. The robotic system of claim 1, wherein the processor is further configured to use the robotic element to move the grasped item to a destination location.

3. The robotic system of claim 1, wherein the end effector comprises a suction-based grasping mechanism.

4. The robotic system of claim 3, wherein the end effector comprises one or more suction cups.

5. The robotic system of claim 4, wherein the one or more suction cups comprises a compliant material that gives way upon coming in contact with the item.

6. The robotic system of claim 1, wherein the sensor data comprise image data generated by one or more cameras.

7. The robotic system of claim 1, wherein the sensor data comprise data generated by one or more of the following: pressure sensors, force sensors, torque sensors, and contact sensors.

8. The robotic system of claim 1, wherein the processor is further configured to use the robotic element to move the grasped item to a destination location and place the item at the destination location.

9. The robotic system of claim 8, wherein the processor is configured to place the item at least in part by moving the item to the destination location, in a first phase of operation, and using the sensor data to adjust the position to the item to be more closely adjacent to a structure or second item adjacent to the destination location.

10. The robotic system of claim 1, wherein the processor is configured to determine the action based at least in part on a plan.

11. The robotic system of claim 10, wherein the processor is configured to generate the plan based on a high level objective.

12. The robotic system of claim 11, wherein the high level objective includes an identification of a plurality of items and for each item a corresponding quantity to be included in a set of items associated with an end destination.

13. The robotic system of claim 12, wherein the items comprise different bread products and the high level objective comprises a manifest or other listing or items and quantities of each to be delivered to a retail store or other destination.

14. The robotic system of claim 1, wherein the processor is further configured to use the robotic element to move the grasped item to a destination location and place the item at the destination location, including by using subsequently-received sensor information to verify placement of the item prior to releasing the item from the grasping mechanism of the end effector.

15. The robotic system of claim 1, wherein the processor uses sensor information to verify placement of the item prior to releasing the item from the grasping mechanism of the end effector at least in part by using the sensor data to determine a height of the product above a height reference and comparing the determined value to an expected value associated with successful placement.

16. The robotic system of claim 1, wherein the end effector includes a plurality of independently-actuated sets of one or more suction cups and the processor is further configured to control the robotic element to grasp simultaneously two or more items, each using one or more of the independently-actuated sets of one or more suction cups.

17. The robotic system of claim 16, wherein the processor is further configured to determine an optimal plan to pick and place a plurality of items, including by determining possible combinations of two or more items capable of being grasped simultaneously and determine an optimal plan that includes a mix of single-grasp and multiple-grasp pick and place actions.

18. The robotic system of claim 1, wherein the processor is further configured to determine a strategy to grasp the item using the robotic element.

19. A method, comprising:
receiving via a communication interface sensor data associated with a workspace in which one or more robotic elements controlled at least in part by the robotic system are present, wherein the sensor data is received from a plurality of different types of sensors;
determining based at least in part on the sensor data an action to be performed in the workspace using one or more of the robotic elements, the action including moving an end effector of a robotic element of the one or more robotic elements to a location within a prescribed distance of a surface of an item to be grasped; monitoring the sensor data to determine that the end effector has reached the location within the prescribed distance of the surface of the item; stopping gross movement of the end effector based at least in part on the determination that the end effector has reached the location within the prescribed distance of the surface of the item; actuating a grasping mechanism of the end effector, subsequent to stopping gross movement of the end effector, to grasp the item using an amount of force and structures associated with minimized risk of damage to one or both of the item and its packaging; and using sensor data generated by the plurality of different types of sensors subsequent to the item being grasped to ensure the item has been grasped securely at least in part by determining whether sensor data generated by a threshold proportion of the different types of sensors indicates the grasp of the item remains secure and moving the item to a buffer location in response to determining that the sensor data generated by the threshold proportion of the different types of sensors does not indicate that the grasp of the item remains secure; and
sending control communications to the robotic element via the communication interface to cause the robotic element to perform the action.

20. A computer program product, the computer program product being embodied in a non-transitory computer readable storage medium and comprising computer instructions for:
receiving via a communication interface sensor data associated with a workspace in which one or more robotic elements controlled at least in part by the robotic system are present, wherein the sensor data is received from a plurality of different types of sensors;
determining based at least in part on the sensor data an action to be performed in the workspace using one or more of the robotic elements, the action including moving an end effector of a robotic element of the one or more robotic elements to a location within a prescribed distance of a surface of an item to be grasped; monitoring the sensor data to determine that the end effector has reached the location within the prescribed distance of the surface of the item; stopping gross movement of the end effector based at least in part on the determination that the end effector has reached the location within the prescribed distance of the surface of the item; actuating a grasping mechanism of the end effector, subsequent to stopping gross movement of the end effector, to grasp the item using an amount of force and structures associated with minimized risk of damage to one or both of the item and its packaging; and using sensor data generated by the plurality of different types of sensors subsequent to the item being grasped to ensure the item has been grasped securely at least in part by determining whether sensor data generated by a threshold proportion of the different types of sensors indicates the grasp of the item remains secure and moving the item to a buffer location in response to determining that the sensor data generated by the threshold proportion of the different types of sensors does not indicate that the grasp of the item remains secure; and
sending control communications to the robotic element via the communication interface to cause the robotic element to perform the action.

* * * * *